United States Patent [19]

Giles, Jr.

[11] Patent Number: 4,481,325

[45] Date of Patent: Nov. 6, 1984

[54] POLYALKYLENELACTONE MODIFIED POLYETHERIMIDES

[75] Inventor: Harold F. Giles, Jr., Cheshire, Mass.

[73] Assignee: General Electric Company, Pittsfield, Mass.

[21] Appl. No.: 566,706

[22] Filed: Dec. 29, 1983

[51] Int. Cl.$^3$ ............................................. C08L 79/08
[52] U.S. Cl. .................................... 524/320; 524/599; 524/602; 525/434; 525/436
[58] Field of Search ....................... 524/320, 599, 602; 525/434, 436

[56] References Cited

U.S. PATENT DOCUMENTS

| | | | |
|---|---|---|---|
| 3,261,811 | 7/1966 | Tatum | 525/436 |
| 3,299,171 | 1/1967 | Knobloch et al. | 525/434 |
| 3,838,097 | 9/1974 | Wirth et al. | 524/602 |

*Primary Examiner*—Lester L. Lee
*Attorney, Agent, or Firm*—Bernard, Rothwell & Brown

[57] ABSTRACT

This invention is concerned with a polyalkylenelactone/polyetherimide blend. More particularly, the invention is concerned with poly(ε-caprolactone)/polyetherimide blends which exhibit improved flow properties and desirable mechanical and physical properties.

9 Claims, 2 Drawing Figures

POLYALKYLENELACTONE MODIFIED POLYETHERIMIDES

BACKGROUND OF THE INVENTION

The present invention relates to polyalkylenelactone modified polyetherimides. More particularly, the invention relates to polyalkylenelactone-modified polyetherimides having improved flow characteristics, and desirable mechanical and physical properties.

Polyetherimides are unique polymers which exhibit superior physical and chemical properties, including high heat resistance, exceptional strength and excellent processability. These polymers can be used as wire coatings and are particularly suited for injection molding and extrusion applications. Polyetherimides are conventionally made by reacting an aromatic bis(ether anhydride) with an organic diamine. Present manufacturing practices include solution polymerization or melt polymerization techniques or combinations of the two, as hereinafter described.

Polyetherimide resins are available commercially in the form of pellets. These pellets can be formed by fabrication into finished articles of widely varying shapes and sizes. Such articles are typically formed by extrusion or injection molding. Because of the high glass transition temperatures associated with polyetherimides, extrusion and injection molding requires elevated temperatures, and apparatus capable of withstanding large forces.

One means for reducing the forces required for extrusion and injection molding of conventional plastics is to incorporate lubricating compounds into the resin. Such lubricating compounds are thought to decrease frictional forces and also to modify the heat resistance of the resin. Throughput rates can be increased substantially by employing lubricating compounds, but the mechanical and physical properties of the plastic (such as strength and heat deflection temperature) are often adversely affected.

An important requirement for lubricants or flow modifiers to be used with polyetherimides is that they be resistant to elevated temperatures. As mentioned above, polyetherimides have high glass transition temperatures. This property is advantageous, because it permits the polymers to be used in high temperature applications. As a result of these high glass transition temperatures, processing temperatures are considerably higher for polyetherimides than for other plastics, and therefore, additives used with polyetherimides must have good heat resistance.

An additional requirement for lubricants and flow modifiers is that, when blended with the polymer to be modified, homogeneous blends are obtained.

SUMMARY OF THE INVENTION

In accordance with the present invention, a polyalkylenelactone modified polyetherimide comprises a polyetherimide and a flow-modifying amount of a polyalkylenelactone.

DETAILED DESCRIPTION

Figure 1:
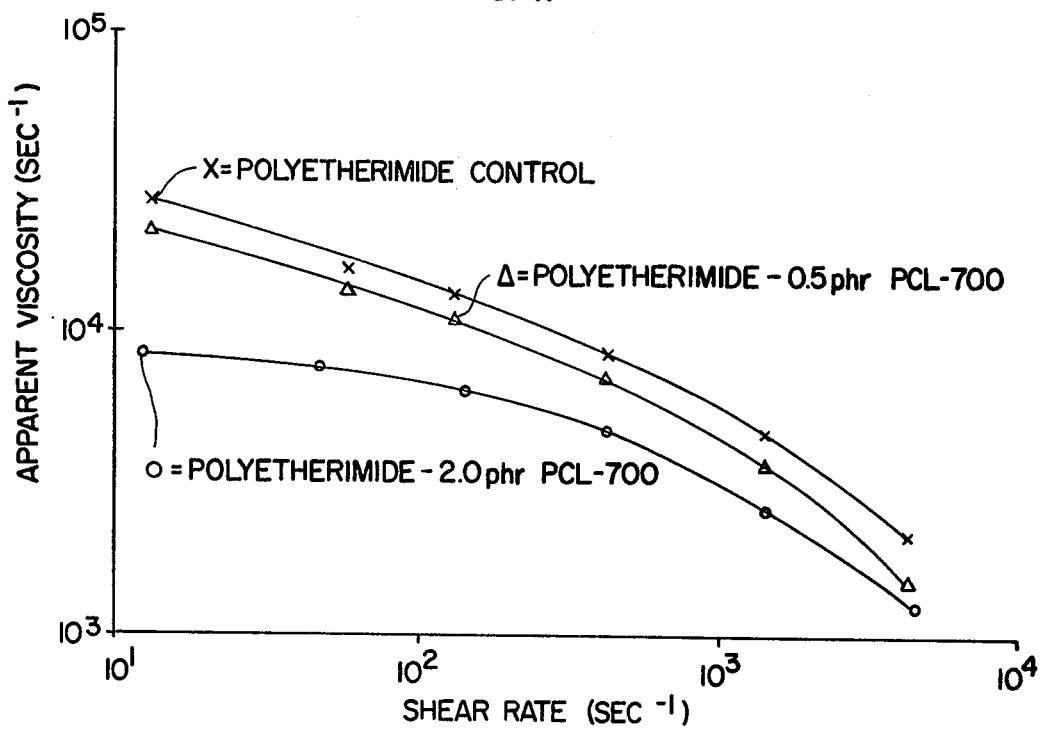

Modification of polyetherimides by incorporation of a flow-modifying amount of a polyalkylenelactone has been found to facilitate extrusion and molding operations and to yield a product having physical properties comparable to the unmodified resins.

The polyalkylenelactones that are used in the present invention are the polymerization product of cyclic ester monomers of the formula:

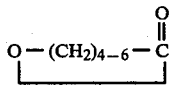

Polyalkylenelactones are prepared from the above lactones, through an addition type reaction. The cyclic ester monomer opens in the presence of an initiator that contains an active hydrogen atom. The resulting polymer is considered to be formed by a heterocyclic polymerization. While the polymerization will proceed without a catalyst, catalysts such as stannous octoate greatly facilitate the reaction. When a diol is used as the initiator, a dihydroxy-terminated polymer is formed. If water is used as the initiator, the resulting polymer is terminated with both carboxyl and hydroxyl functionality. Branched polymers can be prepared by using triols tetraols, etc. as initiators. Preferably the polyalkylenelactones have a molecular weight of from 4000 to 45,000.

The various polyalkylenelactones used in the present invention include, for example, polyvalerlactone, polycaprolactone and polycapryllactone. Particularly preferred is poly($\epsilon$-caprolactone).

Poly($\epsilon$-caprolactone) is a partially crystalline polymer that has a melting point of around 60° C. It is available from Union Carbide Corporation, Danbury, Conn., U.S.A., in three molecular weight grades. One grade, PCL-700, has a molecular weight of about 40,000. The others PCL-300 and PCL-150 have molecular weights of about 10,000 and 5,000 respectively.

The polyetherimides employed in the compositions of this invention are generally represented by the formula:

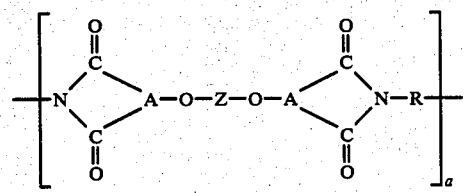

where "a" represents a whole number in excess of 1, e.g., 10 to 10,000 or more, the group —O—A< is selected from:

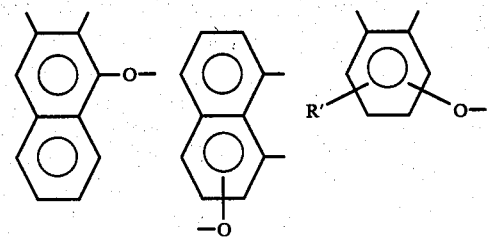

R' being hydrogen, lower alkyl or lower alkoxy. Preferably the polyetherimide includes the latter —O—A< group where R' is hydrogen such that the polyetherimide is of the formula:

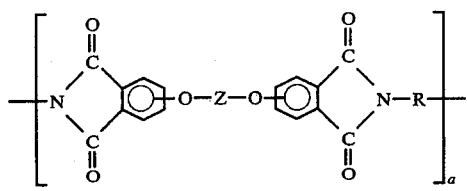

and the divalent bonds of the —O—Z—O— radical are in the 3,3'; 3,4'; 4,3' or the 4,4' position; Z is a member of the class consisting of (1)

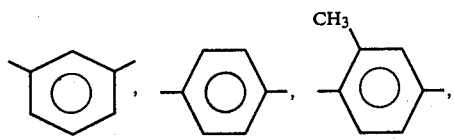

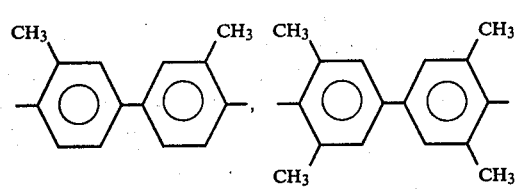

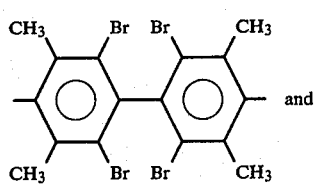

and (2) divalent organic radicals of the general formula:

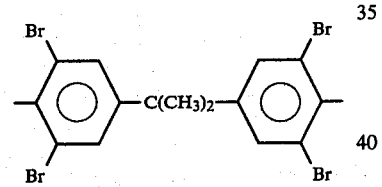

where X is a member selected from the class consisting of divalent radicals of the formulas,

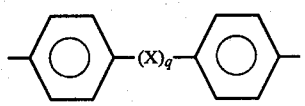

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_{(2-8)}$ alkylene terminated polydiorganosiloxane, and (3) divalent radicals included by the formula:

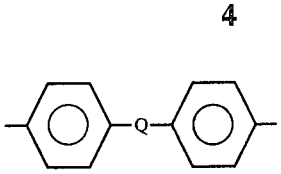

where Q is a member selected from the class consisting of:

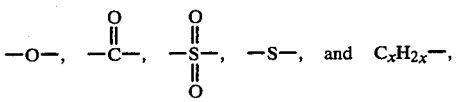

where X is a whole number from 1 to 5 inclusive. Particularly preferred polyetherimides for the purposes of the present invention include those where —O—A< and Z respectively are:

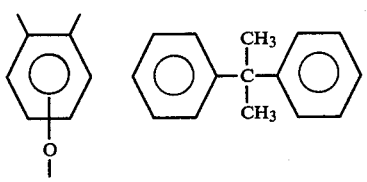

and R is selected from:

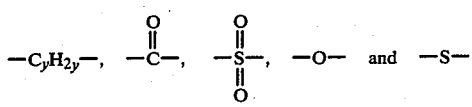

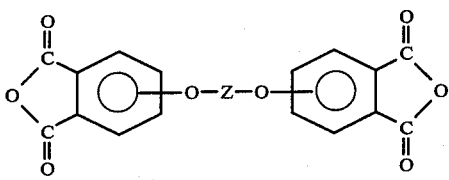

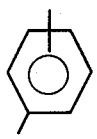

The polyetherimides where R is metaphenylene are most preferred.

The polyetherimides can be obtained by any of the methods well known to those skilled in the art, including the reaction of an aromatic bis(ether anhydride) of the formula:

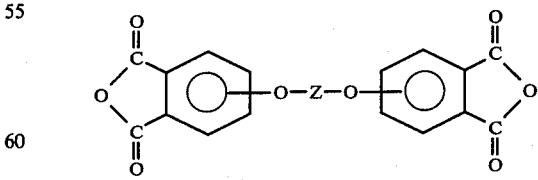

where Z is as defined hereinbefore with an organic diamine of the formula:

$H_2N$—R—$NH_2$ where R is as defined hereinbefore.

Aromatic bis(ether anhydride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)-diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl 1-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Science, U.S.S.R.), U.S.S.R. No. 257,010, Nov. 11, 1969, Appl. May 3, 1967. In addition, dianhydrides are shown by M. M. Koton, F. S. Florinski, Zh. Org. Khin., 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis($\beta$-amino-t-butyl)toluene, bis(p-$\beta$-amino-t-butylphenyl)ether, bis(p-$\beta$-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° C. to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [$\eta$] greater than 0.2 deciliters per gram, preferably 0.35 to 0.60, or 0.7 deciliters per gram or even higher when measured in m-cresol at 25° C.

The compositions of this invention generally comprise a polyetherimide and a flow-modifying amount of a polyalkylenelactone. The amount of polyalkylenelactone employed in the compositions can vary, depending on the particular polymers used. Generally, the amount of polyalkylenelactone ranges from about 0.2 wt. % to about 5 wt. % of the polyetherimide/polyalkylenelactone blend. Preferably, the amount of polyalkylenelactone ranges from about 0.5 wt. % to about 2.5 wt. % of such blend.

Methods for forming the polyalkylenelactone modified polyetherimides may vary considerably. Prior art blending techniques are generally satisfactory. A preferred method comprises blending the polymers, extruding the blend, and chopping the extrudate into pellets suitable for molding by means conventionally used to mold normally solid thermoplastic compositions.

The polyalkylenelactone-modified polyetherimides of this invention have been found to have significantly lower apparent viscosities than corresponding unmodified polyetherimides. Depending upon shear rate, these modified polymers have been found to have apparent viscosities ranging from 30% to 80% of the viscosities of the unmodified polymers. These lower viscosities result in lower torsion forces and improved throughput rates during extrusion and injection molding operations.

A particularly desirable feature of these modified polymers is that the polyalkylenelactones do not significantly affect the mechanical properties, such as heat distortion temperature, tensile strength and impact strengths of the polyetherimides.

The present invention is further illustrated by the following examples, which are not intended to be limiting.

EXAMPLE I

The flow characteristics of polycaprolactone-modified polyetherimides were demonstrated by viscometric measurements using a Gottfert capillary rheometer.

The rheometer was manufactured by Gottfert Werkstoff-Prufmaschinen of Buchen/Odenwald, West Germany. The samples were extruded at 357° for testing.

The polyetherimide used in these tests was of the following formula:

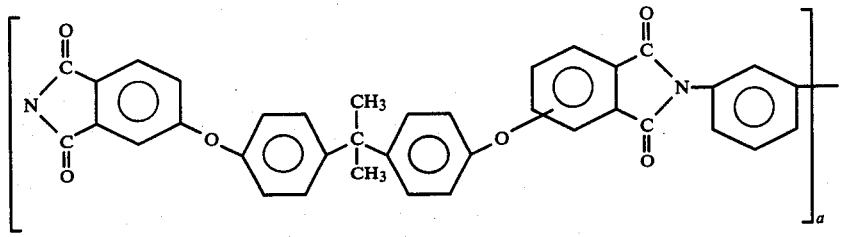

and is a commercially available resin sold by General Electric Company, Pittsfield, Mass., U.S.A., under the trademark ULTEM ®.

As a control, the apparent viscosities of unmodified polyetherimide at various shear rates were determined. Blends of polyetherimide with 0.5 parts per hundred resin (phr) and 2.0 phr of polycaprolactone (Union Carbide PCL-700) were also tested as described above. The results of these experiments are shown in Tables 1-3 below, and are depicted graphically in FIG. 1.

TABLE 1

| Polyetherimide Control | |
|---|---|
| Shear Rate (sec$^{-1}$) | Apparent Viscosity (Poise) |
| 4246.4 | 2,182 |
| 1415.2 | 4,750 |
| 428.1 | 8,279 |
| 436.8 | 8,887 |
| 136.9 | 13,498 |
| 61.9 | 16,263 |
| 13.8 | 27,980 |

TABLE 2

| Polyetherimide - 0.5 phr Polycaprolactone (PCL-700) | |
|---|---|
| Shear Rate (sec$^{-1}$) | Apparent Viscosity (Poise) |
| 4301.8 | 2,024 |
| 1415.2 | 3,966 |
| 428.1 | 7,377 |
| 136.9 | 11,281 |
| 60.4 | 13,470 |
| 13.8 | 21,484 |

TABLE 3

| Polyetherimide - 2.0 phr Polycaprolactone (PCL-700) | |
|---|---|
| Shear Rate (sec$^{-1}$) | Apparent Viscosity (Poise) |
| 4448.8 | 1,308 |
| 1415.2 | 2,548 |
| 436.8 | 6,346 |
| 48.8 | 7,912 |
| 13.1 | 8,421 |

EXAMPLE II

Figure 2:
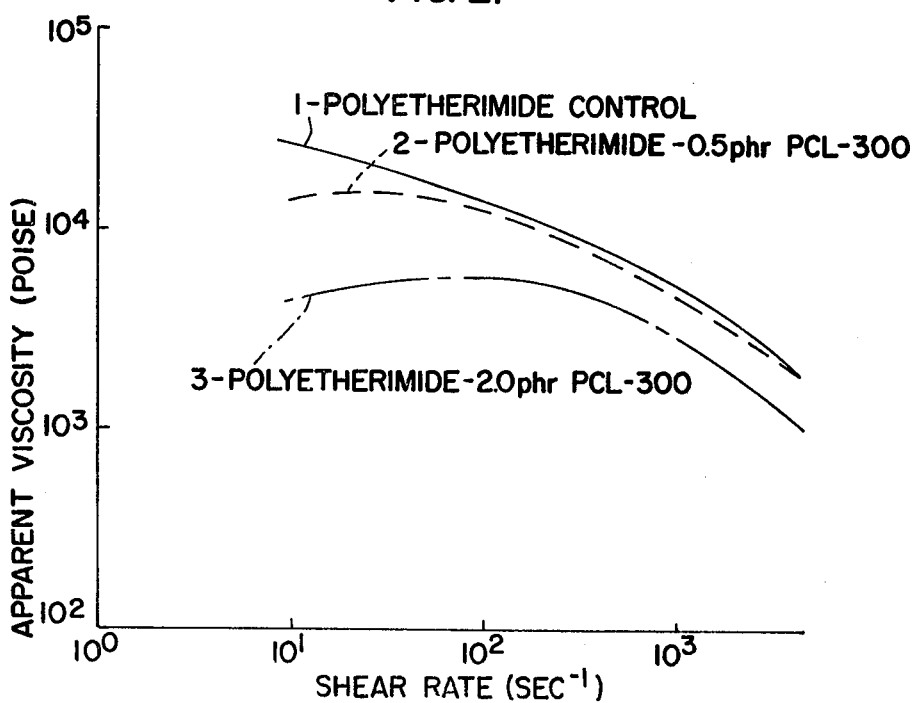

The experiment of Example I was repeated in all essential details, except Union Carbide PCL-300 grade of polycaprolactone was used. The results of the experiment are shown in Tables 4, 5 and 6 below and are depicted graphically in FIG. 2.

TABLE 4

| Polyetherimide Control | |
|---|---|
| Shear Rate (sec$^{-1}$) | Viscosity (Poise) |
| 14.56 | 25,500 |
| 58.24 | 17,500 |
| 142.69 | 13,100 |
| 440.44 | 8,180 |
| 1399.94 | 4,860 |
| 4301.75 | 2,100 |

TABLE 5

| Polyetherimide - 0.5 phr Polycaprolactone (PCL-300) | |
|---|---|
| Shear Rate (sec$^{-1}$) | Viscosity (Poise) |
| 16.7 | 15,400 |
| 62.61 | 14,000 |
| 147.78 | 11,700 |
| 427.34 | 8,290 |
| 1456.00 | 3,820 |
| 4246.42 | 2,090 |

TABLE 6

| Polyetherimide - 2.0 phr Polycaprolactone (PCL-300) | |
|---|---|
| Shear Rate (sec$^{-1}$) | Viscosity (Poise) |
| 16.74 | 5,150 |
| 68.43 | 5,290 |
| 157.98 | 5,950 |
| 441.90 | 5,110 |
| 1365.00 | 2,370 |
| 4301.75 | 1,190 |

What is claimed is:

1. A polyalkylenelactone modified polyetherimide comprising a polyetherimide and a flow-modifying amount of polyalkylenelactone having a molecular weight in the range of from about 4,000 to 45,000.

2. The polyalkylenelactone modified polyetherimide of claim 1 wherein the polyalkylenelactone is selected from the group consisting of polyvalerlactone, polycaprolactone and polycapryllactone.

3. The polyalkylenelactone modified polyetherimide of claim 2 wherein the polyalkylenelactone is poly(ε-caprolactone).

4. The polyalkylenelactone modified polyetherimide of claim 3, wherein the molecular weight of the poly(ε-caprolactone) is in the range of 5,000 to 40,000.

5. The polyalkylenelactone modified polyetherimide of claim 1 wherein the polyalkylenelactone is present in amounts from 0.2 to about 5.0 weight percent of the polyetherimide/polyalkylenelactone blend.

6. The polyalkylenelactone modified polyetherimide of claims 1, 2 or 3, wherein the polyetherimide has the formula:

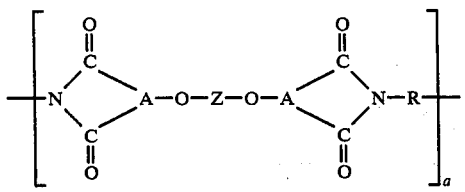

where "a" represents a whole number in excess of 1, the group —O—A< is selected from:

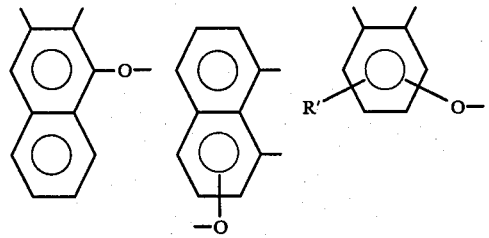

R' being hydrogen, lower alkyl or lower alkoxy, Z is a member of the class consisting of (1):

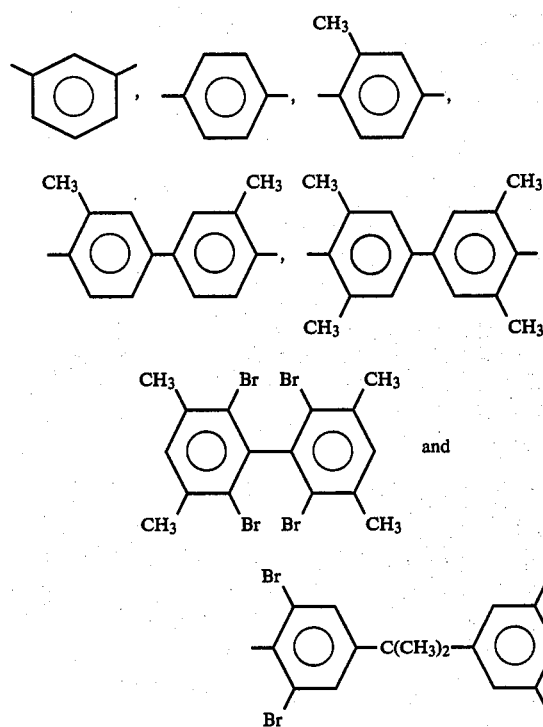

and (2) divalent organic radicals of the general formula:

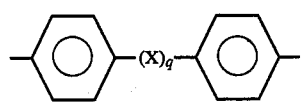

where X is a member selected from the class consisting of divalent radicals of the formulas,

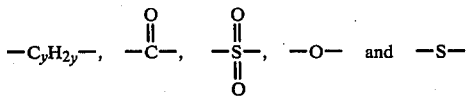

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, C(2-8) alkylene terminated polydiorganosiloxane, and (3) divalent radicals included by the formula:

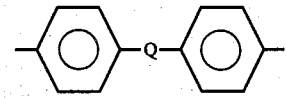

where Q is a member selected from the class consisting of:

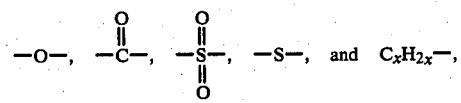

where x is a whole number from 1 to 5 inclusive.

7. The polycaprolactam modified polyetherimide of claim 6, wherein the polyetherimide is of the formula:

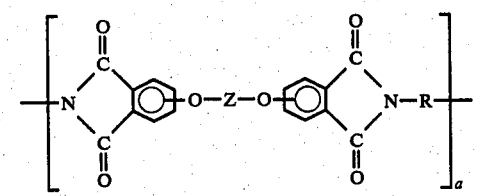

and the divalent bonds of the —O—Z—O— radical are in the 3,3'; 3,4'; 4,3' or the 4,4' position.

8. The polyalkylenelactone modified polyetherimide of claim 7, wherein Z is;

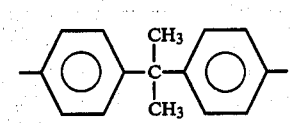

and R is selected from;

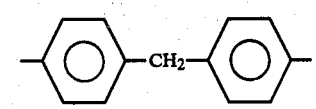

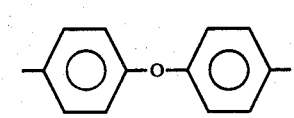

9. The polyalkylenelactone modified polyetherimide of claim 8, wherein the polyetherimide is of the formula:
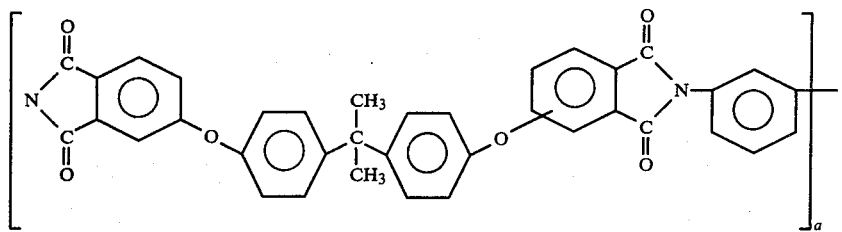
* * * * *